US008607302B2

(12) United States Patent
Morris

(10) Patent No.: US 8,607,302 B2
(45) Date of Patent: Dec. 10, 2013

(54) METHOD AND SYSTEM FOR SHARING LABELED INFORMATION BETWEEN DIFFERENT SECURITY REALMS

(75) Inventor: James Morris, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1302 days.

(21) Appl. No.: 11/564,774

(22) Filed: Nov. 29, 2006

(65) Prior Publication Data

US 2008/0127297 A1    May 29, 2008

(51) Int. Cl.
*G06F 21/00* (2013.01)
(52) U.S. Cl.
USPC .............. 726/1; 726/14; 726/15; 713/182; 713/189; 380/44; 380/278; 709/224; 455/433
(58) Field of Classification Search
USPC ............................................ 726/1, 12
See application file for complete search history.

(56) References Cited

U.S. PATENT DOCUMENTS

| | | | |
|---|---|---|---|
| 6,505,192 B1 * | 1/2003 | Godwin et al. | 707/3 |
| 6,539,483 B1 * | 3/2003 | Harrison et al. | 726/1 |
| 6,915,436 B1 * | 7/2005 | Booth et al. | 726/3 |
| 6,950,824 B1 * | 9/2005 | Babiskin et al. | 1/1 |
| 6,996,842 B2 * | 2/2006 | Strahm et al. | 726/13 |
| 7,134,022 B2 * | 11/2006 | Flyntz | 713/182 |
| 7,215,667 B1 * | 5/2007 | Davis | 370/389 |
| 7,486,659 B1 * | 2/2009 | Unbehagen et al. | 370/351 |
| 7,933,282 B1 * | 4/2011 | Gupta et al. | 370/412 |
| 8,316,435 B1 * | 11/2012 | Varadhan et al. | 726/15 |
| 2002/0062344 A1 * | 5/2002 | Ylonen et al. | 709/204 |
| 2002/0188871 A1 * | 12/2002 | Noehring et al. | 713/201 |
| 2003/0061495 A1 * | 3/2003 | Minnick | 713/189 |
| 2003/0065812 A1 * | 4/2003 | Beier et al. | 709/236 |
| 2003/0156582 A1 * | 8/2003 | Belgaied et al. | 370/389 |
| 2004/0083295 A1 * | 4/2004 | Amara et al. | 709/229 |
| 2004/0139313 A1 * | 7/2004 | Buer et al. | 713/150 |
| 2004/0172464 A1 * | 9/2004 | Nag | 709/223 |
| 2005/0063381 A1 * | 3/2005 | Kayalackakom et al. | 370/389 |
| 2005/0102529 A1 * | 5/2005 | Buddhikot et al. | 713/200 |
| 2006/0056297 A1 * | 3/2006 | Bryson et al. | 370/230 |
| 2006/0056406 A1 * | 3/2006 | Bouchard et al. | 370/389 |
| 2007/0157305 A1 * | 7/2007 | Dajiang | 726/14 |
| 2007/0199049 A1 * | 8/2007 | Ziebell | 726/3 |
| 2007/0208873 A1 * | 9/2007 | Lu et al. | 709/238 |
| 2007/0300298 A1 * | 12/2007 | Goranson et al. | 726/22 |
| 2009/0222924 A1 * | 9/2009 | Droz et al. | 726/24 |

OTHER PUBLICATIONS

McCune et al, "DeuTeRiuM-A System for Distributed Mandatory Access Control", IBM Research Division, Feb. 2, 2006.*

* cited by examiner

*Primary Examiner* — Morshed Mehedi
(74) *Attorney, Agent, or Firm* — Lowenstein Sandler LLP

(57) ABSTRACT

Embodiments of the present invention extend protection of network traffic between different security realms based on security labeling. In particular, embodiments of the present invention label provide for implicit labeling of traffic shared between different security realms. The traffic may be shared using IPsec protocols. A gateway inspects the IPsec traffic and identifies security associations (SAs) of the IPsec traffic. The gateway then determines a security label of the SA. Various access control policies may then be applied to the traffic based on its security label.

14 Claims, 3 Drawing Sheets

METHOD AND SYSTEM FOR SHARING LABELED INFORMATION BETWEEN DIFFERENT SECURITY REALMS

FIELD OF THE INVENTION

The present invention relates to systems and methods for securing networks and, more particularly, to filtering traffic across different security realms.

BACKGROUND OF THE RELATED ART

With the advent and ubiquity of the Internet, virtual private networks have emerged as a way to build a private communication network over a shared public or private infrastructure or a base network. Virtual private networks provide secure private connections over the Internet by enabling authentication of users and locations, delivering secure and private "tunnels."

Today, most virtual private networks are Internet Protocol (IP) based and are established through the Internet. Typically, one or more local networks or hosts are connected securely across the Internet using the well known IPsec standard. IPsec is a framework of open standards for ensuring secure private communications over the Internet. Based on standards developed by the Internet Engineering Task Force (IETF), IPsec is intended to ensure confidentiality, integrity, and authenticity of data communications across a public network. IPsec provides a necessary component of a standards-based, flexible solution for deploying a network-wide security policy.

Locally, on a local network or host, a mandatory access control policy (MAC) is often implemented to protect and contain computer processes, data, and system devices from misuse. A MAC involves denying users full control over the access to resources that they create. Instead, the system security policy determines the access rights granted, and a user may not grant less restrictive access to their resources than the administrator specifies. Information under the control of the MAC are labeled and the security controls applied to a piece of information is dependent upon its label. For example, security labels, such as those used in the Bell-Padula model are known to those skilled in the art. Hence, a MAC defines an architecture for the evaluation of all security-related labels attached to information and makes decisions based upon the operations context and those same data labels.

In general, MAC implementation requires a highly trustworthy information processing system. For example, each computer that is being deployed with a MAC must use a trusted operating system (OS). Because all information in an MLS environment is physically accessible by the OS, strong logical controls must exist to ensure that access to information is strictly controlled.

While MAC security has been made generally available via operating systems like Linux, and extended to networking via IPsec labeling, there is currently no firewall-equivalent method of controlling the flow of IPsec-labeled traffic between networks connected across a VPN. Unfortunately, at this time, there is no known mechanism which translates IPsec-based labeling between different security realms of a VPN, where different security policies may be in effect. In addition, in some cases the security labels will have the same semantic meaning in different security realms but have a different representation. In other instances, the same security labels may have different semantic meanings.

Accordingly, it would desirable to provide a mechanism for effectively labeling traffic according to representational and/or semantic translation policies across various security realms. It would also be desirable to provide methods and systems that can enforce and apply access control policies that utilize security labels to secured network traffic, such as IPsec packets.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
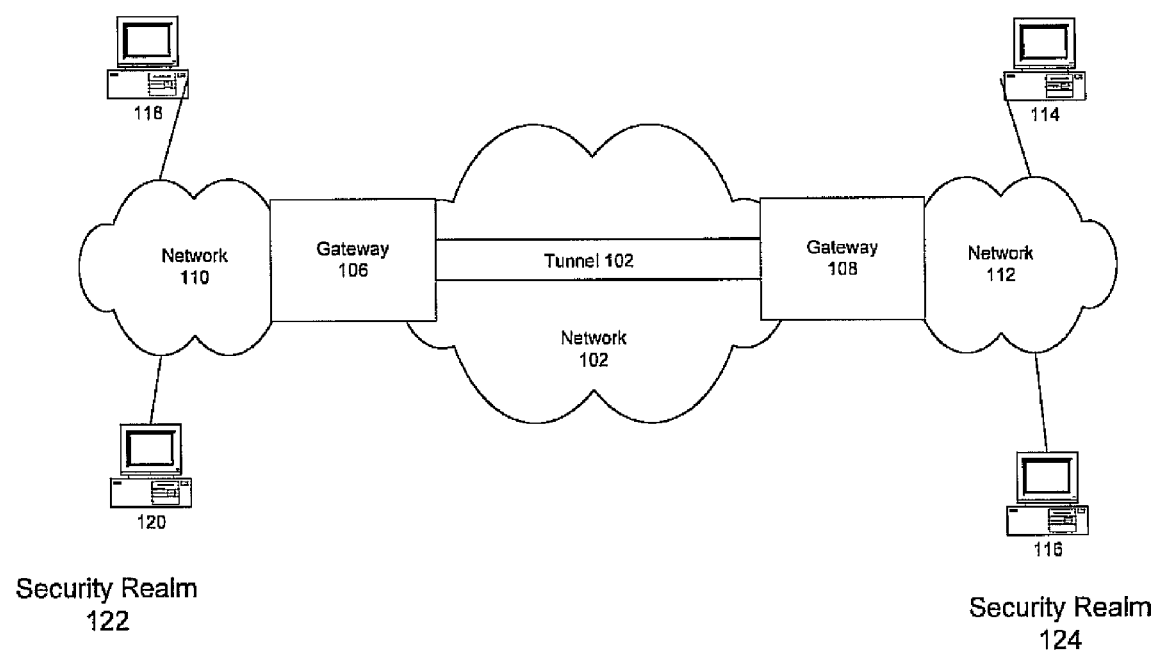
FIG. 1 illustrates an exemplary system that is in accordance with embodiments of the present invention.

For simplicity and illustrative purposes, the principles of the present invention are described by referring mainly to exemplary embodiments thereof. One of ordinary skill in the art, however, would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical, and structural changes may be made to the embodiments without departing from the spirit and scope of the present invention. The following detailed description is, therefore, not to be taken in a limiting sense and the scope of the present invention is defined by the appended claims and their equivalents.

In general, embodiments of the present invention provide for implicit labeling of information even if it shared between different security realms and performing access controls on the information based on the labels. A security realm may be any set of devices and connections which are managed within an administratively defined boundary and controlled via a logically distinct set of access control policies, such as one or more MAC policies. Generally, the policies within a security realm will thus use same semantics for its security labels. A security realm may encompass a single machine or a multitude of machines and networks.

In some embodiments, information is securely shared between different security realms by using the well known Internet Protocol Security ("IPsec") protocols. As the IPsec traffic passes between security realms, embodiments of the present invention inspect the traffic to identify the security associations (SAs) associated with the traffic. For example, the SA of various IPsec packets may be determined by inspecting the security parameters index value in the IPsec packet, the IPsec protocol indicator (e.g., Encapsulated Security Packet (ESP) or Authentication Header (AH)), and the destination address of the IPsec packet. A security label of the SA traffic is then determined. The security label may be determined, for example, by using a static or dynamic lookups against values used when the SAs were configured or negotiated. Each security realm may then perform various access controls, such as MAC policies, based on its local interpretation of the security label associated with the SA. For example, a security realm may consult with a security policy database containing rules for the interpretation of security labels determined from the IPsec SAs and the access controls, such as MAC policies, that are to be applied to the labeled information.

In some embodiments, a gateway is provided to apply IPsec processing, such as a IPsec encapsulation, labeling, and filtering, to traffic passing in/out of a security realm. In addition, the gateway may perform various access control functions. For example, as the gateway receives traffic protected by IPsec, it may inspect the IPsec traffic and determine the SAs associated with the traffic. The gateway may then determine a security label of the traffic from the SA. Accordingly, the gateway may filter packets using the typical protections provided by IPsec and also apply an access control policy based on the implicit security label derived from the SA of the IPsec traffic.

Reference will now be made in detail to exemplary embodiments of the invention, which are illustrated in the accompanying drawings. Wherever possible, the same reference numbers will be used throughout the drawings to refer to the same or like parts.

FIG. 1 is a general block diagram of an exemplary system 100. As shown, system 100 may include a wide area network 104, gateways 106 and 108, networks 110 and 112, computers 114, 116, 118, and 120. For purposes of illustration, network 110 and computers 118 and 120 may comprise a first security realm 122 and network 112 and computers 114 and 116 may comprise a second security realm 124. These components are briefly discussed below and may be implemented using hardware and software that is well known to those skilled in the art.

As shown, an IPsec tunnel 102 may be established between gateways 106 and 108 through network 104 between security realms 122 and 124. Tunnel 102 may be established using encapsulated Internet Protocol packets, which have been encrypted by an encryption protocol, such as RSA, Digital Encryption Standard (DES), and Triple DES (3DES). The structure and operation of tunnel 102 as an IPsec tunnel is specified by the IPsec standards, which are incorporated by reference herein. Of course, one skilled in the art will recognize that security realms 122 and 124 may share information in packets that are unencrypted. For example, the IPsec standards provide for sharing of information based on applying authentication headers. Alternatively, security realms 122 and 124 may share information using non-standard mechanisms beyond what is specified in the IPsec standards, such as a proprietary protocol, or may simply share information in an unprotected form.

Network 104 provides a communication infrastructure for the various entities depicted in network 100 of FIG. 1. Network 104 may include a shared, public, or private network and encompass a wide area or local area. For example, network 104 may be implemented using the Internet to facilitate communication between security realms 122 and 124.

Gateways 106 and 108 may provide an entrance and an exit point for communications between network 104 and security realms 122 and 124. As shown, network 110 may interface network 104 via gateway 106. Likewise, network 112 may interface network 104 via gateway 108. Gateways 106 and 108 may be implemented, for example, using one or more of the following: a computer, a server, a router, a switch, a firewall, or any other type of network device. In some embodiments, gateways 106 and 108 are configured to run the Linux operating system in accordance with the principles of the present invention. One skilled in the art will recognize that the operating systems of gateways 106 and 108 may include various security technologies to extend their capabilities. For example, Security Enhanced Linux (SELinux) is a technology that may be included in the Linux operating systems. Of course, other operating systems, such as Solaris, Unix, OSX, and the like, may be employed in various embodiments.

Gateways 106 and 108 are also configured to determine and provide security labeling passing between security realms 122 and 124. In general, gateways 106 and 108 may be configured to provide a gateway function and an access control function. The gateway function comprises the processing related to IPsec protections, such as IPsec labeling and filtering. The access control function extends the standard IPsec protections. In particular, the access control function comprises determining security labels based on the SAs of the IPsec traffic and applying access control policies to the traffic based on the security labels.

Gateways 106 and 108 may filter both IPsec and IPsec protected traffic. Generally, gateways 106 and 108 may filter traffic once it has been de-encapsulated successfully in accordance with the IPsec standards using the typical parameters provided by IPsec. However, in addition, gateways 106 and 108 may also filter traffic based on the implicit security label that is derived from the SA of the IPsec traffic according to the applicable access control policy.

Gateways 106 and 108 may determine the SA based on the SPI, IPsec protocol, and destination address of the IPsec traffic. According to IPsec standards, SAs are one way, and thus, a two-way connection (the typical case) requires at least two SAs. Furthermore, each IPsec protocol (ESP/AH) has its own SA in each direction. In order to track the SAs, information for SAs are kept in a policy database shown in FIG. 3. Gateways 106 and 108 are also further described with reference to FIG. 2.

Networks 110 and 112 may facilitate communications for a particular security realm. Networks 110 and 112 may be implemented as local area networks or corporate intranets using technologies, such as Ethernet, Frame Relay, Asynchronous Transfer Mode, or Internet Protocols.

Computers 114, 116, 118, and 120 provide one or more users a machine to participate and share information. Computers 114, 116, 118, and 120 may be implemented using well known devices, such as a general purpose computer, a server, etc. For example, computers 114, 116, 118, and 120 may be implemented as servers that provide one or more services for their respective networks 110 and 112. For example, computer 114 may provide services including: browsing services using the Hypertext Transport Protocol ("HTTP"); file transfer services using protocols, such as Network File System ("NFS") or File Transport Protocol ("FTP"); electronic mail service; naming services, such as Domain Name Service ("DNS"); and directory services, such as Lightweight Directory Access Protocol ("LDAP") services.

Figure 2:
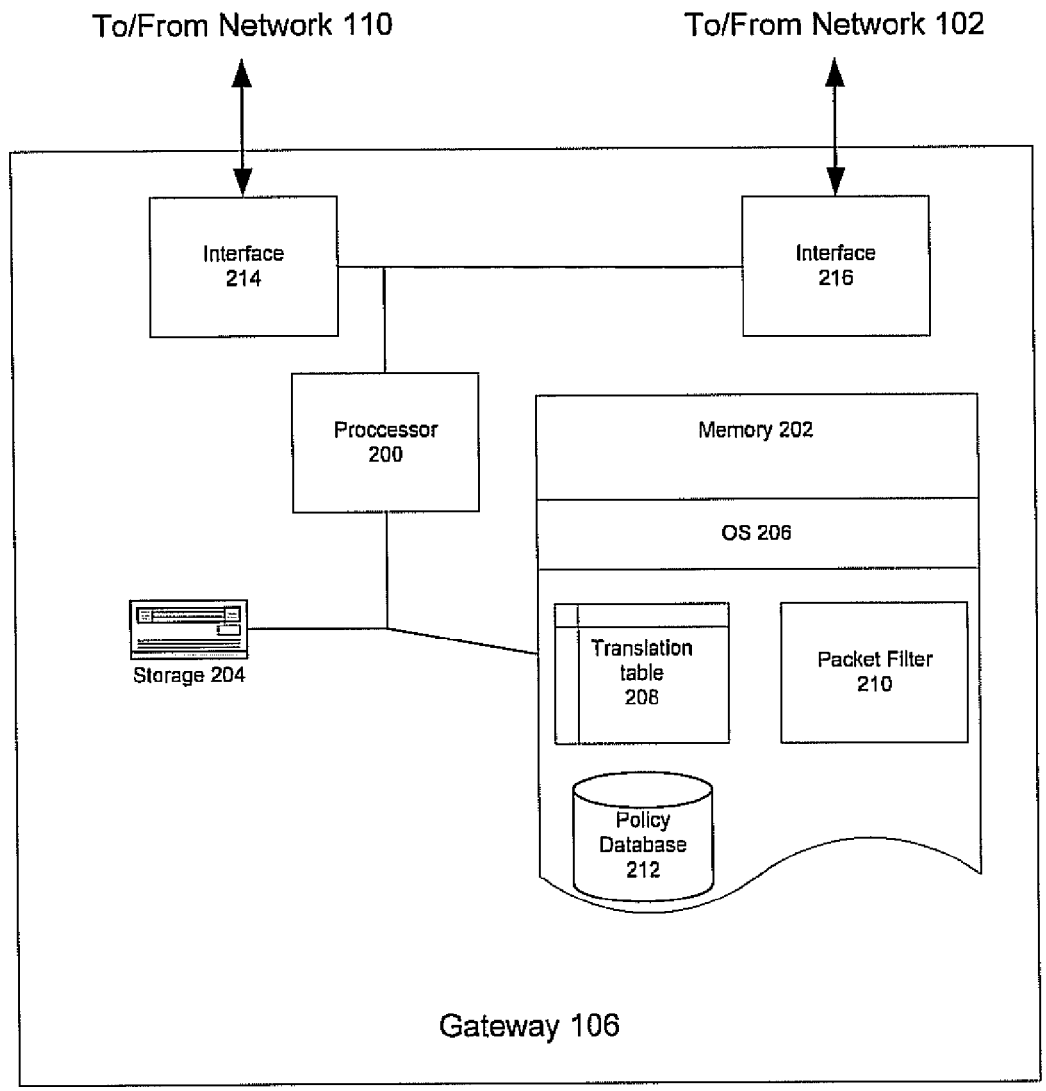
FIG. 2 illustrates an exemplary architecture of the system shown in FIG. 1.

FIG. 2 illustrates a general architecture of gateway 106 (and gateway 108) that is in accordance with embodiments of the present invention.

Gateway 106 may include a processor (CPU) 200, a memory 202, a storage device 204, and network interfaces 216 and 218. Gateway 106 may also include other devices (not shown), such as a display, a keyboard, and a printer.

Gateway 106 may alternatively include multiple CPUs. CPU 200 may also include, for example, one or more of the following: a co-processor, memory, registers, and other processing devices and systems as appropriate.

Memory 202 may provide a primary memory for CPU 200, such as for instructions for program code. Memory 202 may be embodied with a variety of components of subsystems, including, a random access memory ("RAM"), and a read-only memory ("ROM"). For example, as noted, when gateway 106 may load program code from storage 204 into memory 202 for execution. As CPU 200 executes the program code, CPU 200 may also retrieve additional portions of program code from storage 204 into memory 202.

As shown in FIG. 2, during execution, gateway 106 may implement an operating system 206, a translation table 208, a packet filter 210, and a policy database 212 in memory 202.

Translation table 208 provides a data structure for translating the security labels into a locally appropriate value. For example, translation table 208 may translate security labels such that they have equivalent semantics in security realms 122 and 124. This translation may be performed according to the information and rules provided in the policy database 212.

Packet filter 210 enforces the security policies on IPsec packets as they pass through gateway 106. In some embodiments, packet filter 210 may be implemented as a component of the kernel in OS 206.

Policy database 212 is consulted to determine what kind of protections to apply to the traffic passing through gateway 106 and provides information as to what actions to perform on this traffic, based on the security labels of the traffic, in addition to standard IPsec protections. Some of the information in database 212 may include: authentication algorithm information, the AH authentication secret; the ESP encryption algorithm; the ESP encryption secret key; a flag indicating whether ESP authentication is enabled; key-exchange parameters; routing restrictions; and an IP filtering policy.

Network interfaces 214 and 216 provide a communications interface between gateway 106, network 104, and network 110. Network interfaces 214 and 216 may be implemented using well known components of hardware and software.

Storage 204 provides a non-volatile storage area for gateway 106. For example, storage 204 may be hard drive, an optical drive, a general-purpose storage device, a removable storage device, and/or other devices capable of storing information.

Storage 204 may include program code and information that is loaded into memory 202 for configuring gateway 106. Storage 204 may include program code for: TCP/IP communications; a firewall or packet filter; an IPsec module; an operating system 318, such as the SELinux including the kernel and device drivers; configuration information for the IP stack such as a Dynamic Host Configuration Protocol (DHCP) client and a DHCP Server; program code for routing packets through one or more tunnels established between gateways 106 and 108; and MAC information for limiting the functions performed through one or more tunnels established between gateways 106 and 108.

Figure 3:
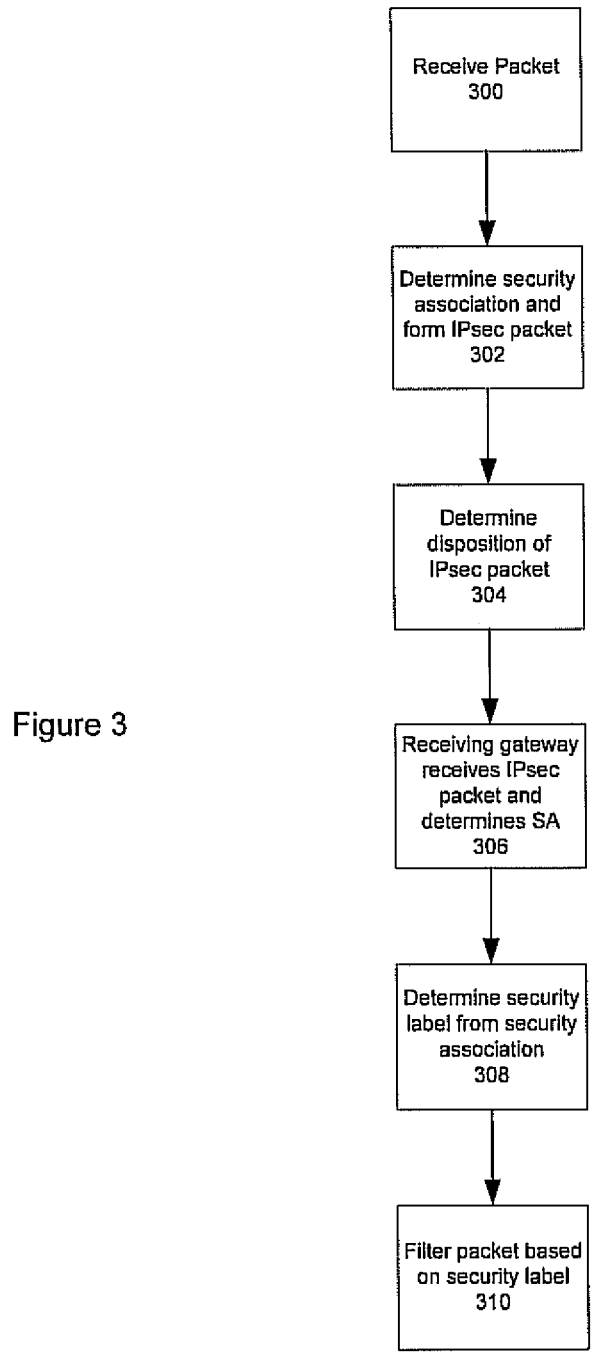
FIG. 3 illustrates an exemplary process flow that is in accordance with embodiments of the present invention.

FIG. 3 illustrates an exemplary process flow that is in accordance with the invention. For purposes of illustration, an example of traffic originating from security realm 122 and destined to security realm 124 will be explained. In stage 300, gateway 106 receives a packet from a computer, such as computer 188, in security realm 122. In stage 302, gateway 106 may then process the packet to form an IPsec packet. For example, gateway 106 may determine the SA for the packet. The SA may comprise a collection of connection-specific parameters, and each pair of gateways can have one or more SAs. Gateway 106 may then form the IPsec packet based on the specifications of the SA.

In stage 304, gateway 106 may consult an IPsec filtering policy and SA for the IPsec packet to determine a disposition of the IPsec packet. Gateway 106 may make these determinations based on well known selectors provided in the IPsec standards. Gateway 106 may then selectively transmit (or pass) the IPsec packet through tunnel 102 based on the IPsec filtering policy.

In stage 306, gateway 108 receives the IPsec packet from gateway 106. Gateway 108 then inspects the IPsec packet and determines the SA of the IPsec packet. In some embodiments, gateway 108 determines the SA of the IPsec packet by inspecting the security parameters index, the protocol header, and destination address.

In stage 308, gateway 108 proceeds with normal IPsec processing and filtering. However, in addition, gateway 108 determines a security label associated with the SA of the IPsec traffic. For example, gateway 108 may perform a lookup statically or dynamically for the security label based on values determined when the SA was established or configured. Furthermore, gateway 108 may translate the security label into a value that is locally significant to security realm 124. This features allows, for example, different security realms to apply the same or equivalent access control policies to traffic shared across a SA.

In stage 310, gateway 108 then consults a mandatory access control policy for the packet and determines a disposition of the packet (i.e., discard, pass, or hold) based on the security label derived from the SA. Accordingly, packet filtering may be performed in security realms 122 based on the value of the security label, which can include type enforcement attributes, multi-level security attributes, and the like.

Certain embodiments may be performed as a computer program. The computer program may exist in a variety of forms both active and inactive. For example, the computer program can exist as software program(s) comprised of program instructions in source code, object code, executable code, or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Other embodiments of the invention will be apparent to those skilled in the art from consideration of the specification and practice of the invention disclosed herein.

What is claimed is:

1. A method comprising:
determining a security association of a packet, from information in the packet;
determining, using a processor, a first security label of the packet from the security association using a lookup, wherein the first security label is associated with a transmitting security realm;
translating, using the processor, the first security label into a second security label, wherein the second security label is associated with a receiving security realm, and wherein the first security label and the second security label have equivalent semantics in the transmitting security realm and the receiving security realm, respectively;
applying an access control policy to the packet based on the second security label; and selectively passing the packet into the receiving security realm based on the security association and the second security label.

2. The method of claim 1, wherein identifying determining the security association comprises:
identifying a security parameters index, a protocol indicator, and a destination address of the IPsec packet; and
determining the security association based on the security parameters index, the protocol indicator, and the destination address.

3. The method of claim 1, wherein the access control policy is indicated by the security label.

4. An apparatus comprising:
means for determining a security association of a packet from information in the packet;
means for determining a first security label of the packet from the security association using a lookup, wherein the first security is associated with a transmitting security realm;
means for translating the first security label into a second security label, wherein
the second security label is associated with a receiving security realm, and wherein the first security label and the second security label have equivalent semantics in the transmitting security realm and the receiving security realm, respectively;
means for applying an access control policy to the packet based on the second security label; and
means for selectively passing the packet into the receiving security realm based on the security association and the second security label.

5. A non-transitory computer readable storage medium comprising executable code, which when executed by a processor, cause the processor to perform operations comprising:
determining a security association of a packet from information in the packet;
determining, using the processor, a first security label of the packet from the security association using a lookup, wherein the first security label is associated with a transmitting security realm;
translating, using the processor, the first security label into a second security label, wherein the second security label is associated with a receiving security realm, and wherein the first security label and the second security label have equivalent semantics in the transmitting security realm and the receiving security realm, respectively;
applying an access control policy to the packet based on the second security label; and
selectively passing the packet into the receiving security realm based on the security association and the second security label.

6. A method comprising:
determining a security association of an IPsec packet from information in the IPsec packet;
determining, using a processor, a first security label of the IPsec packet from the security association using a lookup, wherein the first security label is associated with the transmitting security realm;
translating, using the processor, the first security label into a second security label,
wherein the second security label is associated with a receiving security realm, and wherein the first security label and the second security label have equivalent semantics in the transmitting security realm and the receiving security realm, respectively; and
selectively passing the IPsec packet into the receiving security realm based on the security association and the second security label, wherein selectively passing the IPsec packet comprises:
determining an access control policy based on the second security label and
selectively passing the IPsec packet into the receiving security realm based on the access control policy.

7. The method of claim 6, wherein determining the first security label comprises performing a static lookup for a value used when the security association of the IPsec packet was established.

8. The method of claim 6, wherein determining the first security label comprises performing a dynamic lookup for a value used when the security association of the IPsec packet was established.

9. A gateway comprising:
a processor; and
a memory coupled to the processor, the memory comprising instructions executable by the processor to determine a security association of a packet from information in the packet,
determine a first security label of the packet from the security association using a lookup, wherein the first security label is associated with a transmitting security realm,
translate the first security label into a second security label, wherein the second security label is associated with a receiving security realm, and wherein the first security label and the second security label have equivalent semantics in the transmitting security realm and the receiving security realm, respectively,
apply an access control policy to the packet based on the second security label, and
selectively pass the packet into the receiving security realm based on the security association and the second security label.

10. The gateway of claim 9, wherein the processor is configured to determine the security association based on a security parameters index, a protocol indicator, and a destination address of the packet.

11. The method of claim 1, wherein the packet is an IPsec packet.

12. The method of claim 1, further comprising receiving the packet from the transmitting security realm.

13. The gateway of claim 9, wherein the packet comprises an IPsec packet.

14. The gateway of claim 9, further comprising one or more interfaces between the receiving security realm and the transmitting security realm.

* * * * *